United States Patent [19]

Morris

[11] 3,875,092

[45] Apr. 1, 1975

[54] ACRYLATE RUBBER VULCANIZABLE COMPOSITIONS

[75] Inventor: Roger E. Morris, Cuyahoga Falls, Ohio

[73] Assignee: The B. F. Goodrich Company, New York, N.Y.

[22] Filed: Sept. 17, 1973

[21] Appl. No.: 397,991

[52] U.S. Cl.... 260/23 AR, 260/47 UA, 260/63 HA, 260/78.5 R, 260/79.7, 260/80.7, 260/80.73, 260/80.76, 260/80.8
[51] Int. Cl. ............................................. C08f 37/00
[58] Field of Search .......... 260/23 AR, 80.8, 80.76, 260/78.5 R, 47 UA, 79.7, 80.73

[56] References Cited

UNITED STATES PATENTS

| | | | |
|---|---|---|---|
| 3,048,552 | 8/1962 | Fang | 260/28.5 |
| 3,288,763 | 11/1966 | Waldron | 260/79.3 |
| 3,324,088 | 6/1967 | Waldron | 260/79.3 |

*Primary Examiner*—Stanford M. Levin
*Attorney, Agent, or Firm*—J. Hughes Powell, Jr.

[57] ABSTRACT

Acrylate rubbers having both halogen and carboxyl cure sites are vulcanized using as the only curing agent a quaternary ammonium salt. The vulcanized compositions exhibit good physical properties and low press-cured and post-cured compression set.

9 Claims, No Drawings

3,875,092

ACRYLATE RUBBER VULCANIZABLE COMPOSITIONS

BACKGROUND OF THE INVENTION

Acrylate rubbers exhibit very favorable qualities of weatherability, high temperature serviceability, and good oil resistance. These qualities make the rubbers useful for under-the-hood automotive applications and out-of-door applications. Their use is limited by the tendency of the vulcanizates to post-cure during use. This results in property change and in some cases in failure of the article. To overcome these problems, the acrylate rubber vulcanizates are purposely postcured, often as long as 24 hours or more, to obtain a more complete cure. This is shown by a reduced compression set. It would be of great advantage to the industry to reduce the time required for, or eliminate the need of post-cure for the acrylate rubber vulcanizates.

Much effort has gone into the development of both faster and more efficient cures of acrylate rubbers. An article in Rubber Chemistry and Technology, Vol. 44, No. 2 (1971), traces the more recent efforts. Various cure sites and cure systems have been evaluated; see U.S. Pat. Nos. 2,600,414; 2,849,426; 3,288,763; 3,324,088; 3,404,134; and 3,732,190. However, the need for a long post-cure has not been eliminated, and improved vulcanizates are desired.

SUMMARY OF THE INVENTION

Compositions comprising (1) an acrylate rubber having both halogen and carboxyl cure sites and (2) a quaternary ammonium salt only as a curative are readily cured to vulcanizates having good physical properties, particularly improved press-cured and post-cured compression set.

DETAILED DESCRIPTION

The acrylate rubbers are interpolymers comprising acrylate monomer(s), a reactive halogen-containing monomer, and a carboxyl-containing monomer.

The acrylate rubber contains from about 40% to about 99.8% by weight, based upon the weight of the polymer, of an acrylate of the formula

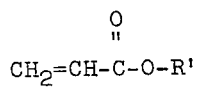

wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethylacrylate, hexylthioethylacrylate, and the like; and $\alpha$ and $\beta$-cyanoethyl acrylate, $\alpha$, $\beta$ and $\gamma$-cyanopropyl acrylate, cyanobutyl acrylate, cyanohexyl acrylate, cyanooctyl acrylate, and the like. Often mixtures of two or more monomers and/or types of acrylate monomers are employed.

Preferredly, the rubber contains from about 65% to about 99.6% by weight of acrylates of the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like; and methoxyethyl acrylate, ethoxyethyl acrylate, and the like. Both an alkyl acrylate and an alkoxyalkyl acrylate can be used.

The rubber contains from about 0.1 to about 30% by weight of an active halogen-containing monomer. The halogen groups can be chlorine, bromine or iodine. These monomers are of two main types, halogen-containing vinylene hydrocarbons and halogen-containing vinyl monomers having the halogen group at least two carbon atoms removed from an oxygen atom(s). Examples of halogen-containing vinylene hydrocarbons are vinyl benzyl chloride, vinyl benzyl bromide, 5-chloromethyl-2-norbornene, 5-bromomethyl-2-norbornene, 5-$\beta$-chloroethyl-2-norbornene, and the like. The second type of monomer, i.e., those having the halogen group at least two carbon atoms removed from an oxygen atom are characterized by having ether (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogencontaining vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5-($\alpha$,$\beta$-dichloropropionylmethyl)-2-norbornene, and the like.

More preferably, the rubber contains from about 0.2 to about 15% by weight of the active halogen-containing monomer. At this level, the halogen content is from about 0.1% to about 5% by weight of the rubber. Due to availability and cost, the chlorine-containing monomers are preferred. Examples of the more preferred monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, 5-chloromethyl-2-norbornene, 2-chloroacetoxyethyl acrylate and methacrylate, and 5-chloroacetoxymethyl-2-norbornene.

The rubbers also contain from about 0.1 to about 20% by weight of a carboxyl-containing monomer. The monomer can be monocarboxylic or poly-carboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2 to about 10% by weight of the carboxyl-containing monomer. At this level, the carboxyl content is from about 0.1 to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene

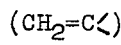

group. Examples of such are phenyl acrylate, cyclohexyl acrylate, methacrylates such as methyl methacrylate, ethyl methacrylate and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, vinyl toluene, and the like vinyl nitriles such as acrylonitrile and methacrylonitrile; vinyl amides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene and diethylene glycol diacrylate.

The acrylate rubbers can be prepared using emulsion (latex), suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about −10°C. to about 100°C., whereas a more preferred range is from about 5°C. to about 80°C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art.

The polymerization normally is continued until about 90% conversion of monomers is obtained. The resulting latex can be coagulated to isolate the polymer. Typical coagulation procedures are salt/acid coagulations, use of polyvalent metal salts such as MgSO$_4$, use of alcohols such as methanol and isopropyl alcohol, and freeze agglomeration techniques. The rubber is then usually washed with water and dried.

The acrylate rubbers are solid elastomers having a dilute solution viscosity (DSV) of over 0.5 as measured on 0.2 gram of rubber in 100 ml. benzene at 25°C. Raw polymer Mooney values (ML–4, at 212°F.) are from about 20 to about 100.

The rubbers are admixed with cure ingredients and compounding ingredients using two-roll mills, internal mixers such as Banburys and extruders, and like equipment.

The acrylate rubbers containing halogen and carboxyl cure sites can be vulcanized using known curatives. Examples of these curatives are the soap-sulfur systems such as potassium and sodium stearate, sodium acetate, and potassium tartate with sulfur or sulfur donors such as dipentamethylene thiuram hexasulfide; polyamines such as hexamethylene diamine, triethylene diamine, triethylene tetraamine, and the like; and ammonium/carboxylic acid salts such as ammonium benzoate and ammonium adipate, used alone or with alkyl halides such as dodecyl bromide. A disadvantage of these curatives is their odor and their failure to develop low compression set after press-cure.

It has been discovered that the acrylate rubbers of this invention can be efficiently vulcanized in the absence of sulfur and/or a metal salt, using a quaternary ammonium salt only as the curative. The vulcanizates exhibit improved presscured and post-cured compression set without a loss in desirable acrylate rubber properties.

The quaternary ammonium salts have the structure

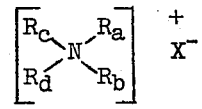

wherein $R_a$, $R_b$, $R_c$ and $R_d$ are hydrocarbon radicals containing 1 to 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S where at least two atoms are C, and X is an anion selected from the group consisting of $RCOO^-$, $H_2BO_3^-$, $HO^-$, $HPO_4^-$, $H_2PO_4^-$, $ROPO_3H^-$, $(RO)_2PO_2H^-$ where R in each occurrence is an alkyl or alkaryl radical containing 1 to 18 carbon atoms, and an alkylphenoxy poly(ethyleneoxy)ethyl phosphate anion.

Examples of the quaternary ammonium salts are: tetramethyl ammonium stearate, tetramethyl ammonium benzoate, tetraethyl ammonium benzoate, trimethyl soya ammonium trimethylhexanoate, trimethyl soya ammonium neodecanoate, trimethyl soya ammonium stearate, trimethyl soya ammonium hydrogen phosphate, trimethyl soya ammonium alkylphenoxy poly(ethylenoxy)ethyl phosphate, trimethyl benzyl ammonium acetate, trimethyl benzyl ammonium stearate, trimethyl benzyl ammonium benzoate, trimethyl benzyl ammonium borate, trimethyl benzyl ammonium hydroxide, trimethyl benzyl ammonium hydrogen phosphate, trimethyl (tetradecyl) ammonium borate, dimethyl ethyl cetyl ammonium hexanoate, dimethyl octyl benzyl ammonium hydroxide, dimethyl oleyl benzyl ammonium decanoate, dimethyl octadecyl benzyl ammonium alkylphenoxy poly(ethyleneoxy)ethyl phosphate, dimethyl phenyl benzyl ammonium stearate, dimethyl dibenzyl ammonium octoate, methyl cetyl dibenzyl ammonium benzoate, cetyl pyridinium borate, dodecyl pyridinium stearate, lauryl pyridinium palmitate and the like.

The quaternary ammonium salts are used in a range from about 0.5 part to about 25 parts by weight, and more preferably, at from about 1.0 part to about 10 parts by weight per 100 parts by weight of the acrylate rubber. The more preferred anions are $RCOO^-$, $OH^-$ and $H_2BO_3^-$. The most preferred anion is $RCCO^-$.

The acrylate rubbers can be admixed with many other rubber compounding ingredients. Examples of such ingredients are fillers such as the carbon blacks, calcium sulfates, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like; petroleum oils, castor oil, tall oil, glycerin, and the like; antioxidants and stabilizers such as phenyl-$\beta$-naphthylamine, 2,6-di-t-butyl paracresol, 2,2'-methylenebis(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl-)isocyanurate, tetrakis-methylene-3(3', 5'-di-t-butyl-4'-hydroxyphenyl)propionate methane, distearyl thiodipropionate, tri(nonylatedphenyl)phosphite, and the like; and other ingredients such as pigments, tackifiers, flame retardants, fungicides, and the like.

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 8 hours at a temperature from about 300°F. to about 375°F.

The novel compositions develop rapid and stable cures. Full property development is achieved faster than with previously known compositions. This is evidenced by the lower compression set values obtained after press-cure and post-cure. The vulcanizates were evaluated as to their plied disk compression set (ASTM D395V), tensile and elongation (ASTM D412), and hardness (ASTM D676-durometer A). Cure times were determined following ASTM D1646, using a Mooney Viscometer with a large rotor, or using a Monsanto Rheometer or a B.F.G. Cone Curometer as described in U.S. Pat. No. 3,494,172.

The vulcanizates are useful in many applications where weatherability, high temperature serviceability, and oil resistance are required. Such applications are under-the-hood automotive parts such as gaskets, seals, packings, belting and hosing, and out-of-doors applications such as weatherstripping, sealants, and hosing.

The following examples serve to more fully illustrate the invention.

EXAMPLE I

A polymer containing ethyl acrylate, n-butyl acrylate, methacrylic acid, and vinyl benzyl chloride was prepared using standard emulsion polymerization techniques. The recipe used is as follows:

| | |
|---|---|
| Water, grams | 2400 |
| n-Butyl acrylate, grams | 1420 |
| Ethyl acrylate, grams | 380 |
| Methacrylic acid, grams | 5.7 |
| Vinyl benzyl chloride, grams | 20 |
| Gafac PE 510[1], grams | 35 |
| Daxad 17[2], grams | 9.5 |
| Sodium sulfate, grams | 5.7 |
| Diisopropylbenzene hydroperoxide, milliliters[3] | 2.8 |
| SFS[4], milliliters[5] | 3.6 |
| Sequestrene NaFe[6], milliliters[7] | 2.0 |
| $Na_2S_2O_4$, milliliters[8] | 15 |

[1] alkylphenoxy poly(ethyleneoxy)ethyl phosphate
[2] polymerized alkyl naphthalene sulfonic acid
[3] 1.4 milliliters catalyst in 10 milliliters acetone
[4] sodium formaldehyde sulfoxalate
[5] 5% by weight in water
[6] sodium ferric ethylenediamine tetraacetic acid
[7] 5% by weight in water
[8] 0.2% by weight in water The Gafac PE 510 was mixed in 200 grams of water and adjusted to a pH of 6.5. The ethyl acrylate, n-butyl acrylate, methacrylic acid, and vinyl benzyl chloride were mixed together. 2200 grams of water was charged to a vessel which had been previously evacuated and purged with nitrogen gas. One-half of the Gafac solution was added, followed by 190 grams of the monomer solution, the Daxad 17 and the sodium sulfate. The reactor mix was cooled to 17°C. and the hydroperoxide, SFS, sequestrene NaFe, and $Na_2S_2O_4$ added to initiate the reaction. Polymerization temperature was maintained at about 20°C. to 25°C. The remaining monomer solution was proportioned into the reactor over a 7-hour period. At 3.5 hours into the run, the remaining one-half of the Gafac solution was added. Total polymerization time was 10 hours. Percent conversion of monomers to polymer was above 95%. The emulsion was coagulated using a 25% by weight solution of NaCl in water, and methanol. The isolated polymer was washed with water and dried. The polymer was a rubber having about a 30 raw polymer Mooney value (M1-4, 212°F.).

The example demonstrates that the polymers employed in this invention are readily prepared using standard polymerization techniques. The polymers are just as easily prepared using suspension, solution, or bulk polymerization procedures and techniques. Use of other halogen-containing monomers and/or other carboxyl-containing monomers prepares a broad range of acrylate rubbers which are useful in this invention.

EXAMPLE II

An acrylate rubber prepared from n-butyl acrylate (75 parts by weight), ethyl acrylate (23 parts), methacrylic acid (0.32 part), and vinyl benzyl chloride (1.1 part) was cured using quaternary ammonium salts only. Good physical properties and excellent press- and post-cured compression set were obtained. The recipes used and data obtained are as follows (in parts by weight):

|  | 1 | 2 |
|---|---|---|
| Rubber | 100 | 100 |
| N550 Black | 55 | 55 |
| N881 Black | 20 | 20 |
| Processing waxes | 2 | 2 |
| Trimethyl soya ammonium stearate | 4.8 | — |
| Dodecyl pyridinium ammonium stearate | — | 4.3 |
| Press-cured 30' at 320°F. |  |  |
| Tensile, psig | 1270 | 1350 |
| Elongation, percent | 160 | 150 |
| Hardness, durometer A | 63 | 66 |
| Compression set, % (70 hrs. at 300°F. plied disks) | 45 | 37 |
| Post-cured 20 hrs. at 300°F. |  |  |
| Tensile, psig | 1120 | 1380 |
| Elongation, percent | 120 | 130 |
| Hardness, durometer A | 66 | 70 |
| Compression set, % (70 hrs. at 300°F. plied disks) | 27 | 26 |

EXAMPLE III

Example II was essentially repeated except for the use of an acrylate rubber prepared from 75 parts of n-butyl acrylate, 22.7 parts of ethyl acrylate, 0.3 part of methacrylic acid, and 2.0 parts of 2-chloroethyl acrylate. The recipe used is: 100 parts rubber, 55 parts N550 black, 20 parts N881 black, 2 parts processing waxes, and 4.8 parts of trimethyl soya ammonium stearate as the curative. Press-cured properties (30' at 320°F.) were: 1200 psig tensile, 260 percent elongation, 50 hardness, and a 49 percent compression set. Post-cured properties (20 hours at 300°F.) were: 1330 psig tensile, 180 percent elongation, 57 hardness, and a 19 percent compression set.

EXAMPLE IV

The acrylate rubber used in Example III was cured using various quaternary ammonium salts. The recipes are as follows:

|  | 1 | 2 | 3 |
|---|---|---|---|
| Rubber | 100 | 100 | 100 |
| N550 black | 55 | 55 | 55 |
| N881 black | 20 | 20 | 20 |
| Processing waxes | 2 | 2 | 2 |
| Trimethyl benzyl ammonium stearate | 1.5 | 2.2 | — |
| Trimethyl benzyl ammonium benzoate | — | — | 0.8 |
| Press-cured 60' at 307°F. |  |  |  |
| Tensile, psig | 800 | 900 | 350 |
| Elongation, percent | 560 | 550 | 550 |
| Hardness, durometer A | 46 | 47 | 45 |
| Post-cured 20 hrs. at 300°F. |  |  |  |
| Tensile, psig | 1120 | 1120 | 1080 |
| Elongation, percent | 270 | 270 | 290 |
| Hardness, Durometer A | 56 | 57 | 57 |

EXAMPLE V

To evaluate a broad range of quaternary ammonium salts that may be employed, and to develop support for the scope of this invention, a screening procedure was developed. The procedure uses a liquid acrylate polymer which has all of the features of the solid acrylate rubber of the invention, i.e., similar acrylate monomer and copolymerizable monomer (if used) content, and the same halogen-containing and carboxylcontaining monomers. The low molecular weight liquid polymer can be prepared using standard emulsion polymerization recipes and techniques except for the use of high levels of t-dodecyl mercaptan as a chain modifier.

The screening procedure comprises mixing the liquid acrylate polymer with a quaternary ammonium salt, placing the mixture into a large test tube, placing the filled test tube into a 150°C. oil bath, putting a stainless steel spatula into the mixture in the tube, said spatula being turned in place and measuring in minutes the time until the mixture gels. A shorter gel time indicates faster cure.

The liquid acrylate polymer used for the screening procedure has a composition consisting of ethyl acrylate (48.8 parts), n-butyl acrylate (48.8 parts), methacrylic acid (0.49 part), and vinyl benzyl chloride (1.95 part), said parts being parts by weight of monomer charged to the reactor. Polymer viscosity (in bulk) is 720,000 centipoise measured at 25°C. using a Brookfield LVT Viscometer at 0.6 rpm with spindle No. 4. The results obtained are in the following table. The quaternary ammonium salt is given in parts by weight per 100 parts of polymer.

| Parts | Quaternary Ammonium Salt | Gel Time Minutes |
|---|---|---|
| 4.0 | Trimethyl benzyl ammoninum acetate | 3 |
| 6.5 | trimethyl benzyl ammonium stearate | 5 |
| 10.0 | Trimethyl benzyl ammonium stearate | 3 |
| 4.0 | Trimethyl benzyl ammonium benzoate | 11 |
| 2.0 | Trimethyl benzyl ammonium hydroxide | 4 |
| 8.0 | Trimethyl benzyl ammonium borate | 2 |
| 4.0 | Trimethyl soya ammonium stearate | 5 |
| 6.0 | Triemethyl soya ammonium stearate | 4 |
| 6.0 | Trimethyl soya ammonium neodecanoate | 2 |
| 8.0 | Trimethyl soya ammonium alkylphenoxy poly(ethyleneoxy)ethyl phosphate | 125 |
| 12.0 | Trimethyl soya ammonium alkylphenoxy poly(ethyleneoxy)ethyl phosphate | 60 |
| 20.0 | Trimethyl soya ammonium alkylphenoxy poly(ethyleneoxy)ethyl phosphate | 11 |
| 5.0 | Tetramethyl ammonium stearate | 4 |
| 6.0 | Tetramethyl ammonium stearate | 4 |
| 2.3 | Tetraethyl ammonium benzoate | 4 |
| 4.0 | Tetraethyl ammonium benzoate | 3 |

Results obtained in the screening procedure correlate very well with the use of the quaternary ammonium salt in solid acrylate rubbers.

I claim:

1. A composition comprising (1) an acrylate rubber consisting essentially of (a) from about 40 percent to about 99.8 percent by weight of an acrylate of the formula

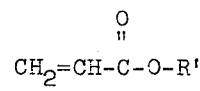

wherein R' is selected from the group consisting of an alkyl radical containing 1 to 18 carbon atoms, an alkoxyalkyl, an alkylthioalkyl, and a cyanoalkyl radical containing 2 to about 12 carbon atoms, (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen atom; (c) from about 0.1 percent to about 20 percent by weight of a carboxylcontaining monomer, and (d) up to 35 percent by weight of a copolymerizable monomer containing a terminal vinylidene group, and (2) as the curative, from about 0.5 part to about 25 parts by weight based on 100 parts by weight of the rubber, of a quaternary ammonium salt of the formula

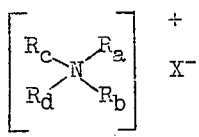

wherein $R_a$, $R_b$, $R_c$ and $R_d$ are hydrocarbon radicals selected from the group consisting of alkyl, aryl, alkaryl and aralkyl radicals containing 1 to 18 carbon atoms, or wherein two or three of the $R_a$, $R_b$, $R_c$ and $R_d$ radicals form with the nitrogen atom a heterocyclic structure containing 3 to 8 carbon atoms selected from the group consisting of C, N, O and S atoms, at least two of which are C; and X is an anion selected from the group consisting of $RCOO^-$, $H_2BO_3^-$, $HPO_4^=$, $H_2PO_4^-$, $HO^-$, $ROPO_3H^-$, $(RO)_2PO_2H$ and an alkyl phenoxy poly(ethyleneoxy)ethyl phosphate anion, where R is an alkyl or alkaryl radical containing 1 to 18 carbon atoms.

2. A composition of claim 1 wherein (1) is an acrylate rubber of (a) from about 65 percent to about 99.6 percent by weight of an acrylate wherein R' is selected from the group consisting of alkyl radicals containing 1 to about 10 carbon atoms and alkoxyalkyl radicals containing 2 to about 8 carbon atoms, (b) from about 0.2 percent to about 15 percent by weight of a halogen-containing monomer, (c) from about 0.2 to about 10 percent by weight of a carboxyl-containing monomer, and (d) up to about 10 percent by weight of a copolymerizable monomer containing a terminal vinylidene group.

3. A composition of claim 2 wherein (a) is selected from the group consisting of ethyl acrylate, n-butyl acrylate, methoxy ethyl acrylate and ethoxy ethyl acrylate, (b) is selected from the group consisting of vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene, (c) is selected from the group consisting of acrylic acid, methacrylic acid, and itaconic acid, and (d) is selected from the group consisting of vinyl acetate, methyl methacrylate, ethyl methacrylate, styrene, acrylonitrile, acrylamide, and diethylene glycol diacrylate.

4. A composition of claim 2 wherein the $X^-$ anion is $RCOO^-$.

5. A composition of claim 2 wherein the quaternary ammonium salt is selected from the group consisting of trimethyl benzyl ammonium acetate, trimethyl benzyl ammonium stearate, trimethyl benzyl ammonium benzoate, trimethyl benzyl ammonium hydroxide, trimethyl benzyl ammonium borate, trimethyl soya ammonium stearate, trimethyl soya ammonium neodecanoate, trimethyl soya ammonium alkylphenoxy poly(ethyleneoxy)ethyl phosphate, tetramethyl ammonium stearate, tetraethyl ammonium benzoate, and dodecyl pyridinium ammonium stearate.

6. A composition of claim 5 wherein the acrylate rubber consists essentially of n-butyl acrylate, ethyl acrylate, methacrylic acid and vinyl benzyl chloride and the curative is trimethyl soya ammonium stearate.

7. A composition of claim 5 wherein the acrylate rubber consists essentially of n-butyl acrylate, ethyl acrylate, methacrylic acid and vinyl benzyl chloride and the curative is dodecyl pyridinium ammonium stearate.

8. A composition of claim 5 wherein the acrylate rubber consists essentially of n-butyl acrylate, ethyl acrylate, methacrylic acid and 2-chloroethyl acrylate and the curative is trimethyl soya ammonium stearate.

9. A composition of claim 5 wherein the acrylate rubber consists essentially of n-butyl acrylate, ethyl acrylate, methacrylic acid and 2-chloroethyl acrylate and the curative is trimethyl benzyl ammonium benzoate.

* * * * *